United States Patent
Li et al.

(10) Patent No.: US 10,574,307 B2
(45) Date of Patent: Feb. 25, 2020

(54) REFERENCE SIGNAL MEASUREMENT METHOD AND APPARATUS

(71) Applicant: Huawei Technologies Co., Ltd., Shenzhen (CN)

(72) Inventors: Xueru Li, Beijing (CN); Kunpeng Liu, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/403,119

(22) Filed: May 3, 2019

(65) Prior Publication Data

US 2019/0260432 A1 Aug. 22, 2019

Related U.S. Application Data

(63) Continuation of application No. PCT/CN2017/109379, filed on Nov. 3, 2017.

(30) Foreign Application Priority Data

Nov. 4, 2016 (CN) .......................... 2016 1 0978479

(51) Int. Cl.
*H04B 7/04* (2017.01)
*H04B 7/0417* (2017.01)
(Continued)

(52) U.S. Cl.
CPC ......... *H04B 7/0417* (2013.01); *H04L 5/0053* (2013.01); *H04W 24/10* (2013.01); *H04W 72/042* (2013.01); *H04L 5/0051* (2013.01)

(58) Field of Classification Search
CPC .......................... H04B 7/0417; H04W 72/042
See application file for complete search history.

(56) References Cited

U.S. PATENT DOCUMENTS 8,848,647 B2 * 9/2014 Kakishima ........... H04B 7/0417
370/329
2012/0063358 A1 * 3/2012 Etemad .................. H04L 5/003
370/254
(Continued)

FOREIGN PATENT DOCUMENTS

CN 101827444 A 9/2010
CN 102291223 A 12/2011
(Continued)

OTHER PUBLICATIONS

Huawei et al, "Discussion on CSI measurement and reporting", 3GPP TSG RAN WG1 Meeting #86bis, Oct. 10-14, 2016, Lisbon, Portugal, 6 pages.

*Primary Examiner* — Freshteh N Aghdam
(74) *Attorney, Agent, or Firm* — Slater Matsil, LLP

(57) ABSTRACT

The present invention describes a channel measurement method, including: sending, by a base station, first control information to user equipment UE, where the first control information is used to indicate a measurement reference signal of the UE on a carrier, and the first control information includes at least one first measurement configuration set, and is used to instruct the UE to measure the measurement reference signal based on the at least one first measurement configuration set; sending, by the base station, the measurement reference signal to the UE.

20 Claims, 4 Drawing Sheets

(51) Int. Cl.
*H04W 72/04* (2009.01)
*H04L 5/00* (2006.01)
*H04W 24/10* (2009.01)

(56) References Cited

U.S. PATENT DOCUMENTS

| | | |
|---|---|---|
| 2012/0188976 A1 | 7/2012 | Kim et al. |
| 2013/0028134 A1 | 1/2013 | Wang et al. |
| 2014/0079149 A1 | 3/2014 | Lee et al. |
| 2014/0355493 A1* | 12/2014 | Niu ................... H04W 76/40 370/280 |
| 2015/0071187 A1 | 3/2015 | Chen et al. |
| 2015/0124638 A1 | 5/2015 | Sun et al. |
| 2017/0127442 A1* | 5/2017 | Sun ................... H04L 5/0055 |
| 2017/0208584 A1* | 7/2017 | Qu .................... H04W 72/042 |
| 2017/0347341 A1* | 11/2017 | Zhang ................ H04B 7/0689 |

FOREIGN PATENT DOCUMENTS

| | | |
|---|---|---|
| CN | 103636253 A | 3/2014 |
| CN | 103716078 A | 4/2014 |
| CN | 104641573 A | 5/2015 |
| EP | 2852072 A1 | 3/2015 |

\* cited by examiner

REFERENCE SIGNAL MEASUREMENT METHOD AND APPARATUS

CROSS-REFERENCE TO RELATED APPLICATIONS

This application is a continuation of International Application No. PCT/CN2017/109379, filed on Nov. 3, 2017, which claims priority to Chinese Patent Application No. 201610978479.5, filed on Nov. 4, 2016. The disclosures of the aforementioned applications are hereby incorporated by reference in their entireties.

TECHNICAL FIELD

This application relates to the field of communications technologies, and in particular, to a reference signal measurement method and an apparatus.

BACKGROUND

A reference signal (RS) is a "pilot signal." In a conventional 4G network, a base station usually allocates a part of system bandwidth to specific user equipment (UE). That is, the base station allocates specific frequency resources to the UE within a specific time. In this case, if the base station needs to know specific frequency resources of relatively high quality, to preferentially allocate the specific frequency resources to the UE and better ensure service quality of the UE, the reference signal may provide reference for the base station during resource scheduling.

In the prior art, the reference signal is configured by using signaling to notify the UE of a resource on which the UE receives the reference signal. However, as a network accuracy requirement increases, the reference signal is configured only by using one piece of signaling, but cannot be accurately controlled. In addition, as a corresponding channel parameter and a communication mode keep changing, corresponding reference signal quality measurement tends to be complicated. As regards real-time feedback, a 5G network has a higher accuracy requirement. Configuring the reference signal by using one piece of single configuration signaling is inflexible. In addition, when a measurement result is subsequently reported, the base station may no longer require redundant results or other parameter information to perform channel estimation, thereby causing a waste of channel resources.

SUMMARY

The present invention provides a reference signal measurement method and an apparatus, to resolve a problem of poor feedback real-time quality and low feedback accuracy.

According to a first aspect, an embodiment of the present invention provides a channel measurement method, including: sending, by a base station, first control information to user equipment UE, where the first control information is used to indicate a measurement reference signal of the UE on a carrier, and the first control information includes at least one first measurement configuration set, and is used to instruct the UE to measure the measurement reference signal based on the at least one first measurement configuration set; sending, by the base station, the measurement reference signal to the UE; and sending, by the base station, second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result.

In a first possible implementation of the first aspect, that the first control information includes at least one first measurement configuration set includes: the first control information includes a first measurement manner set, the first measurement manner set includes at least one manner of measuring the measurement reference signal, and the manner of measuring the measurement reference signal is a manner in which the UE measures the measurement reference signal.

With reference to the first possible implementation of the first aspect, in a second possible implementation, the second control information includes a second measurement manner set, and the second measurement manner set is a subset of the first measurement manner set.

With reference to either of the first possible implementation and the second possible implementation of the first aspect, in a third possible implementation, the first measurement manner set includes one or more of the following measurement manners: measurement in an open-loop multiple-input multiple-output (MIMO) transmission method, measurement in a semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

With reference to any one of the first aspect, or the first to the third possible implementations of the first aspect, in a fourth possible implementation, that the first control information includes at least one first measurement configuration set includes: the first control information includes a first measurement type set, the first measurement type set includes a type of the measurement result, and the type of the measurement result is a type of a measurement result obtained by the UE by measuring the measurement reference signal.

With reference to the fourth possible implementation of the first aspect, in a fifth possible implementation, the second control information includes a second measurement type set, and the second measurement type set is a subset of the first measurement type set.

With reference to the fourth possible implementation of the first aspect, in a sixth possible implementation, the second control information includes a second measurement type set, the second measurement type set includes a type of the measurement result, and at least one type of the measurement result that is in the second measurement type set is determined based on the type of the measurement result that is in the first measurement type set.

With reference to any one of the fourth to the sixth possible implementations of the first aspect, in a seventh possible implementation, the first measurement type set includes one or more of the following measurement manners: a precoding matrix indication (PMI), a channel quality indicator (CQI), a rank indication (RI), a beam indicator channel state information RS resource indicator (CRI), a channel matrix, a channel eigenvector, and a channel spatial covariance matrix.

With reference to any one of the first aspect, or the first to the seventh possible implementations of the first aspect, in an eighth possible implementation, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal.

With reference to the eighth possible implementation of the first aspect, in a ninth possible implementation, the second control information includes a second measurement granularity set, and the second measurement granularity set is a subset of the first measurement granularity set.

With reference to any one of the first aspect, or the first to the ninth possible implementations of the first aspect, in a tenth possible implementation, the first control information is downlink control information (DCI) or a multiple access control element (MAC CE); and/or the second control information is downlink control information DCI.

According to a second aspect, an embodiment of the present invention provides a channel measurement method, including: receiving, by user equipment UE, first control information sent by the base station, where the first control information is used to indicate a measurement reference signal of the UE on a carrier, and the first control information includes at least one first measurement configuration set, and is used to instruct the UE to measure the measurement reference signal based on the at least one first measurement configuration set; receiving, by the UE, the measurement reference signal sent by the base station; and receiving, by the user equipment UE, second control information sent by the base station, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result.

In a first possible implementation of the second aspect, that the first control information includes at least one first measurement configuration set includes: the first control information includes a first measurement manner set, the first measurement manner set includes at least one manner of measuring the measurement reference signal, and the manner of measuring the measurement reference signal is a manner in which the UE measures the measurement reference signal.

With reference to the first possible implementation of the second aspect, in a second possible implementation, the second control information includes a second measurement manner set, and the second measurement manner set is a subset of the first measurement manner set.

With reference to either of the first possible implementation and the second possible implementation of the second aspect, in a third possible implementation, the first measurement manner set includes one or more of the following measurement manners: measurement in an open-loop or semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

With reference to any one of the second aspect, or the first to the third possible implementations of the second aspect, in a fourth possible implementation, that the first control information includes at least one first measurement configuration set includes: the first control information includes a first measurement type set, the first measurement type set includes a type of the measurement result, and the type of the measurement result is a type of a measurement result obtained by the UE by measuring the measurement reference signal.

With reference to the fourth possible implementation of the second aspect, in a fifth possible implementation, the second control information includes a second measurement type set, and the second measurement type set is a subset of the first measurement type set.

With reference to the fourth possible implementation of the second aspect, in a sixth possible implementation, the second control information includes a second measurement type set, the second measurement type set includes a type of the measurement result, and at least one type of the measurement result that is in the second measurement type set is determined based on the type of the measurement result that is in the first measurement type set.

With reference to any one of the fourth to the sixth possible implementations of the second aspect, in a seventh possible implementation, the first measurement type set includes one or more of the following measurement manners: a precoding matrix indication PMI, a channel quality indicator CQI, a rank indication RI, a beam indicator CRI, a channel matrix, a channel eigenvector, and a channel spatial correlation matrix.

With reference to any one of the second aspect, or the first to the seventh possible implementations of the second aspect, in an eighth possible implementation, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal.

With reference to the eighth possible implementation of the second aspect, in a ninth possible implementation, the second control information includes a second measurement granularity set, and the second measurement granularity set is a subset of the first measurement granularity set.

With reference to any one of the second aspect, or the first to the ninth possible implementations of the second aspect, in a tenth possible implementation, the first control information is downlink control information DCI or a multiple access control element MAC CE; and/or the second control information is downlink control information DCI.

According to a third aspect, an embodiment of the present invention provides a base station, including: a determining unit, configured to determine a measurement reference signal, first control information, and second control information; and a sending unit, configured to send the first control information to user equipment UE, where the first control information is used to indicate the measurement reference signal of the UE on a carrier, and the first control information includes at least one first measurement configuration set, and is used to instruct the UE to measure the measurement reference signal based on the at least one first measurement configuration set, where the sending unit is further configured to send the measurement reference signal to the UE; and the sending unit is further configured to send the second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result.

In a first possible implementation of the third aspect, that the first control information includes at least one first measurement configuration set includes: the first control information includes a first measurement manner set, the first measurement manner set includes at least one manner of measuring the measurement reference signal, and the manner of measuring the measurement reference signal is a manner in which the UE measures the measurement reference signal.

With reference to the first possible implementation of the third aspect, in a second possible implementation, the second control information includes a second measurement manner set, and the second measurement manner set is a subset of the first measurement manner set.

With reference to either of the first possible implementation and the second possible implementation of the third aspect, in a third possible implementation, the first measurement manner set includes one or more of the following measurement manners: measurement in an open-loop or semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

With reference to any one of the third aspect, or the first to the third possible implementations of the third aspect, in a fourth possible implementation, that the first control information includes at least one first measurement configuration set includes: the first control information includes a first measurement type set, the first measurement type set includes a type of the measurement result, and the type of the measurement result is a type of a measurement result obtained by the UE by measuring the measurement reference signal.

With reference to the fourth possible implementation of the third aspect, in a fifth possible implementation, the second control information includes a second measurement type set, and the second measurement type set is a subset of the first measurement type set.

With reference to the fourth possible implementation of the third aspect, in a sixth possible implementation, the second control information includes a second measurement type set, the second measurement type set includes a type of the measurement result, and at least one type of the measurement result that is in the second measurement type set is determined based on the type of the measurement result that is in the first measurement type set.

With reference to any one of the fourth to the sixth possible implementations of the third aspect, in a seventh possible implementation, the first measurement type set includes one or more of the following measurement manners: a precoding matrix indication PMI, a channel quality indicator CQI, a rank indication RI, a beam indicator CRI, a channel matrix, a channel eigenvector, and a channel spatial covariance matrix.

With reference to any one of the third aspect, or the first to the seventh possible implementations of the third aspect, in an eighth possible implementation, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal.

With reference to the eighth possible implementation of the third aspect, in a ninth possible implementation, the second control information includes a second measurement granularity set, and the second measurement granularity set is a subset of the first measurement granularity set.

With reference to any one of the third aspect, or the first to the ninth possible implementations of the third aspect, in a tenth possible implementation, the first control information is downlink control information DCI or a multiple access control element MAC CE; and/or the second control information is downlink control information DCI.

According to a fourth aspect, an embodiment of the present invention provides user equipment UE, including: a receiving unit, configured to receive first control information sent by a base station, where the first control information is used to indicate a measurement reference signal of the UE on a carrier, and the first control information includes at least one first measurement configuration set; and a determining unit, configured to measure the measurement reference signal based on the at least one first measurement configuration set, where the receiving unit is further configured to receive the measurement reference signal sent by the base station; and the receiving unit is further configured to receive second control information sent by the base station, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result.

In a first possible implementation of the fourth aspect, that the first control information includes at least one first measurement configuration set includes: the first control information includes a first measurement manner set, the first measurement manner set includes at least one manner of measuring the measurement reference signal, and the manner of measuring the measurement reference signal is a manner in which the UE measures the measurement reference signal.

With reference to the first possible implementation of the fourth aspect, in a second possible implementation, the second control information includes a second measurement manner set, and the second measurement manner set is a subset of the first measurement manner set.

With reference to either of the first possible implementation and the second possible implementation of the fourth aspect, in a third possible implementation, the first measurement manner set includes one or more of the following measurement manners: measurement in an open-loop or semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

With reference to any one of the fourth aspect, or the first to the third possible implementations of the fourth aspect, in a fourth possible implementation, that the first control information includes at least one first measurement configuration set includes: the first control information includes a first measurement type set, the first measurement type set includes a type of the measurement result, and the type of the measurement result is a type of a measurement result obtained by the UE by measuring the measurement reference signal.

With reference to the fourth possible implementation of the fourth aspect, in a fifth possible implementation, the second control information includes a second measurement type set, and the second measurement type set is a subset of the first measurement type set.

With reference to the fourth possible implementation of the fourth aspect, in a sixth possible implementation, the second control information includes a second measurement type set, the second measurement type set includes a type of the measurement result, and at least one type of the measurement result that is in the second measurement type set is determined based on the type of the measurement result that is in the first measurement type set.

With reference to any one of the fourth to the sixth possible implementations of the fourth aspect, in a seventh possible implementation, the first measurement type set includes one or more of the following measurement manners: a precoding matrix indication PMI, a channel quality indicator CQI, a rank indication RI, a beam indicator CRI, a channel matrix, a channel eigenvector, and a channel spatial covariance matrix.

With reference to any one of the fourth aspect, or the first to the seventh possible implementations of the fourth aspect, in an eighth possible implementation, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal.

With reference to the eighth possible implementation of the fourth aspect, in a ninth possible implementation, the second control information includes a second measurement granularity set, and the second measurement granularity set is a subset of the first measurement granularity set.

With reference to any one of the fourth aspect, or the first to the ninth possible implementations of the fourth aspect, in a tenth possible implementation, the first control information is downlink control information DCI or a multiple access control element MAC CE; and/or the second control information is downlink control information DCI.

According to the foregoing method, after sending the first control information to the UE, the base station device instructs the UE to measure the reference signal based on the first control information, and then sends the second control information to the UE, to instruct the UE to report the measurement result. The second control information is used to instruct the UE to report a proper measurement result, so that feedback accuracy can be improved, and/or channel resources can be saved. In addition, only the second control information indicates the channel resource used by the UE to report the measurement result, so that a quantity of bits that carry the first control information can be reduced, and unnecessary channel resource overheads can be reduced. In addition, only the second control information indicates the channel resource, so that the base station can flexibly allocate a proper channel resource to the UE based on a channel status or network load at a time of sending the second control information to instruct the UE to report the measurement result, or related information of another UE, to improve flexibility of allocating the channel resource, and help improve an overall data transmission rate of a network.

DETAILED DESCRIPTION OF ILLUSTRATIVE EMBODIMENTS

To make the objectives, technical solutions, and advantages of the present invention clearer, the following describes the technical solutions of the embodiments of the present invention with reference to the accompanying drawings.

A base station sends first control information to user equipment UE, where the first control information is used to indicate a measurement reference signal of the UE on a carrier, and the first control information includes at least one first measurement configuration set, and is used to instruct the UE to measure the measurement reference signal based on the at least one first measurement configuration set. The base station sends the measurement reference signal to the UE. The base station sends second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result. According to the foregoing method, after sending the first control information to the UE, the base station device instructs the UE to measure the reference signal based on the first control information, and then sends the second control information to the UE, to instruct the UE to report the measurement result. The second control information is used to instruct the UE to report a proper measurement result, so that feedback accuracy can be improved, and/or channel resources can be saved. In addition, only the second control information indicates the channel resource used by the UE to report the measurement result, so that a quantity of bits that carry the first control information can be reduced, and unnecessary channel resource overheads can be reduced. In addition, only the second control information indicates the channel resource, so that the base station can flexibly allocate a proper channel resource to the UE based on a channel status or network load at a time of sending the second control information to instruct the UE to report the measurement result, or related information of another UE, to improve flexibility of allocating the channel resource, and help improve an overall data transmission rate of a network. It should be understood that the second control information may be further used to determine, based on another parameter, the channel resource used by the UE to report the measurement result.

Figure 1:
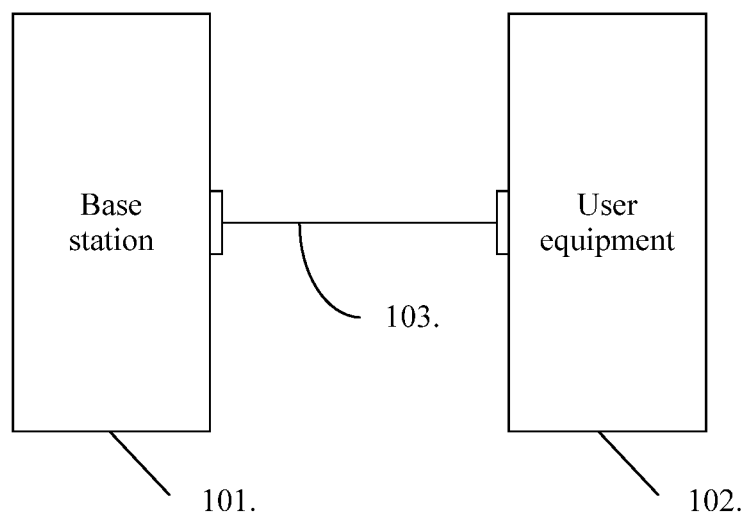
FIG. 1 is a schematic architectural diagram of a possible application scenario according to an embodiment of the present invention.

FIG. 1 shows a possible application scenario and a corresponding method according to an embodiment of the present invention. A link 103 between a base station device 101 and user equipment UE 102 forms through an air interface, to implement interconnection and interworking. It should be understood that the link 103 shown in FIG. 1 represents only an example of a link. In addition to exchanging data with the UE, the base station is configured to control a resource and a configuration of the UE. It should be understood that in some cases, the UE may also implement a control function, or the UE and the base station negotiate with each other.

The base station is configured to send first control information to the user equipment UE, where the first control information is used to indicate a measurement reference signal of the UE on a carrier. The first control information includes at least one first measurement configuration set, and is used to instruct the UE to measure the measurement reference signal based on the at least one first measurement configuration set.

In an embodiment, the first control information may be RRC or other control signaling. In another embodiment, the first control information may be downlink control information DCI or a multiple access control element MAC CE. An advantage of using the DCI or the multiple access control element MAC CE is that a configuration is flexible and a response latency is short. The first measurement configuration set is used to indicate a configuration for measuring the measurement reference signal by the UE. It should be understood that there may be one or more configurations herein, which are used to indicate a measurement quantity and a manner in which the UE measures the measurement reference signal.

The first control information may be determined based on a result reported after the UE measures another reference signal. For example, the UE may report feedback information by measuring the another reference signal or receiving a paging message. If the base station determines channel quality of the UE, the base station may determine a measurement configuration set included in the first control information and a specific measurement configuration of each measurement configuration set. For example, when the base station learns, in several subframes or slots from another measurement process before determining the first control information, that the UE is in a low-speed moving state and has a relatively high CQI value, the base station may determine that the measurement configuration set includes at least a measurement manner set, and the measurement manner set includes at least a closed-loop MIMO measurement manner. In another embodiment, the first control information may be further determined based on another configuration. For example, after cell reselection, the first control information may be determined based on historical information, and then measurement on a message sent by a neighboring base station or a neighboring control node is performed for supplement. Alternatively, the first control information may be determined based on an initial configuration.

The base station sends the measurement reference signal to the UE. The base station sends second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set. Only the second control information in the first control information and the second control information includes uplink resource allocation information, and the uplink resource allocation information is used to indicate a channel resource on which the UE reports the measurement result.

The following specifically describes the first measurement configuration set and the second measurement configuration set in detail.

There may be one or more first measurement configuration sets and/or second measurement configuration sets. Different parameter items, measurement manner items, and measurement granularity items in a measurement process, or other configuration items that need to be indicated by the base station to the UE in a measurement process may be configured in different sets. The first measurement set and the second measurement set should not be limited to the foregoing specific set.

In an embodiment, the configuration set includes a first measurement manner set, the first measurement manner set includes at least one manner of measuring the measurement reference signal, and the manner of measuring the measurement reference signal is a manner in which the UE measures the measurement reference signal. The manner of measuring the measurement reference signal may include but is not limited to: measurement in an open-loop or semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method. The base station may determine the measurement manner set of the UE based on some priori information, for example, as described in the foregoing embodiment, the base station may determine, in the previous several subframes or slots, the measurement manner set of the UE based on a measurement result reported by the UE or another UE, and determine the measurement set based on the determined measurement manner set of the UE. For example, the base station determines channel quality of the UE based on a measurement result obtained by the UE by measuring another measurement reference signal. If the base station determines that the measurement result meets a preset condition or a threshold, for example, a CQI is relatively high, the base station determines that the measurement manner set includes a closed-loop MIMO measurement manner, an open-loop MIMO measurement manner, and a semi-open-loop MIMO measurement manner. The base station sends the determined measurement manner set to the UE by using the first control information, so that the UE can separately measure the reference signal based on the measurement in the open-loop MIMO transmission method, the measurement in the semi-open-loop MIMO transmission method, and the closed-loop MIMO measurement manner. An advantage of this is: A plurality of measurement manners are configured, so that the UE can perform a plurality of types of measurement on the reference signal, and flexibly respond to a possible change in channel quality. Therefore, when triggering the UE to report the measurement result, the base station can instruct, based on latest channel quality, the UE to report a measurement result of a corresponding measurement manner, and can configure a most proper transmission solution for subsequent data transmission of the UE, thereby improving data transmission efficiency. It should be understood that in the embodiments of the present invention, after receiving the first control information, the UE may determine a measurement manner based on the first control information. However, the UE may further determine an actual measurement manner based on an actual situation and a capability of the UE. It should be understood that in the embodiments of the present invention, the base station may configure the measurement manner set based on a default option, or totally dynamically configure the measurement manner set.

In another embodiment, the first control information includes a first measurement type set, the first measurement type set includes a type of the measurement result, and the type of the measurement result is a type of a measurement result obtained by the UE by measuring the measurement reference signal. The type of the measurement result herein is a result type or category that needs to be measured by the UE, for example, a precoding matrix indication PMI, a channel quality indicator CQI, a rank indication RI, a beam indicator CRI, a channel matrix, a channel eigenvector, and a channel spatial covariance matrix. Similar to the foregoing measurement manner set, in an embodiment, the base station may determine, based on some priori information, the measurement result type that may need to be measured by the UE. For example, the base station may determine the measurement result type in the previous several subframes or slots based on a measurement result reported by the UE or another UE, to determine the measurement type set. For example, if the base station learns, based on a reporting quantity used for the UE to measure another measurement reference signal, that channel quality of the UE is relatively high, for example, a CQI is relatively high, the base station determines that the first measurement type set includes a CQI, a PMI, an RI, and a channel spatial covariance matrix. In this case, the base station determines that the first measurement type set is {PMI, RI, CQI, channel spatial covariance matrix}. An advantage of this is: A plurality of measurement types are configured, so that the UE can perform the plurality of types of measurement on the reference signal, and flexibly respond to a possible change in channel quality. Therefore, when triggering the UE to report the measurement result, the base station can instruct, based on latest channel quality, the UE to report a measurement result of a corresponding measurement type, thereby improving flexibility of reporting the measurement result, and improving quality and efficiency of subsequent data transmission of the UE. In another embodiment, the base station may also completely configure the first measurement type set based on a default value, or totally dynamically configure the first measurement type set.

Figure 2:
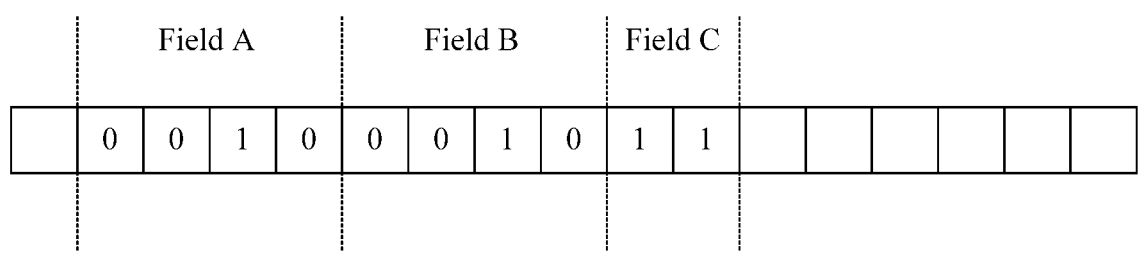
FIG. 2 is a schematic diagram of an information field according to an embodiment of the present invention.

In still another embodiment, the first control information includes a first measurement granularity set, the first measurement granularity set includes a granularity of the measurement result, and the granularity of the measurement result is a granularity of a measurement result obtained by the UE by measuring the measurement reference signal. In a possible implementation, the first measurement granularity set includes at least one of the following measurement granularities: wideband feedback of a channel measurement parameter, sub-band feedback of a channel measurement parameter, feedback of M sub-bands with optimal channel measurement parameters, and channel state information (CSI) feedback corresponding to N beams with optimal channel measurement parameters, where M and N are positive integers. The feedback of the M sub-bands with optimal channel measurement parameters may be channel parameters of the M sub-bands with optimal measurement parameters during measurement of channel measurement parameters of several sub-bands, and the CSI feedback corresponding to the N beams with optimal channel measurement parameters may be CSI corresponding to the N beams with optimal measurement parameters. It should be understood that both the first measurement granularity set and the first measurement type set may indicate a measurement result type corresponding to a measurement granularity of the UE. For example, the first measurement type set includes a channel quality indicator CQI and a channel eigenvector v, and the first measurement granularity set includes wideband feedback, feedback of M sub-bands with highest CQIs, and an index of a corresponding sub-band. In this case, the UE measures the wideband CQI and the channel eigenvector v, and measures CQIs of the M sub-bands with highest CQIs and a channel eigenvector v of the corresponding sub-band. It should be understood that the first measurement granularity set may be combined with the first measurement type set in a manner to indicate a corresponding measurement result type of the UE. For example, the first measurement type set includes a channel quality indicator CQI and a channel eigenvector v, and the first measurement granularity set corresponding to the channel quality indicator CQI includes wideband feedback and feedback of M sub-bands with highest CQIs. When the first measurement granularity set includes the feedback of the M sub-bands with highest CQIs, an index of a corresponding sub-band may be further fed back. If the first measurement granularity set corresponding to the channel eigenvector v includes the feedback of the M sub-bands with highest CQIs and the index of the corresponding sub-band, the UE measures a wideband CQI, a sub-band CQI, channel eigenvectors v of the M sub-bands with highest CQIs, and the index of the corresponding sub-band. In another embodiment, all of the first measurement manner set, the first measurement type set, and the first measurement granularity set or a combination of the three sets may be alternatively included in the first control information to instruct the UE to measure the measurement reference signal based on the at least one first measurement configuration set. In an embodiment, the channel parameters of the M sub-bands with optimal measurement parameters are fed back, and then sub-bands corresponding to the channel parameters of the M sub-bands with optimal measurement parameters may be further fed back. In specific implementation, an index of a sub-band in the M sub-bands with optimal measurement parameters may be fed back. The CSI corresponding to the N beams with optimal measurement parameters is fed back, and then beam indicators CRI of the N beams with optimal measurement parameters may be further fed back. With reference to FIG. 1, a possible form of the first control information is shown in an embodiment shown in FIG. 2. The first control information may include K fields, and each field is used to indicate a measurement configuration set. In FIG. 2, a value of K may be 10. For example, a field A is used to indicate the first measurement manner set. In the field A, "0010" indicates that the first measurement manner set includes measurement in a closed-loop MIMO transmission method and measurement in a transmit diversity transmission method, and is used to instruct the UE to measure the measurement reference signal based on the measurement in the closed-loop MIMO transmission method and the measurement in the transmit diversity transmission method. A field B is used to indicate the first measurement type set. In the field B, "1000" indicates that the first measurement type set includes a PMI, a CQI, and an RI, and is used to instruct the UE to measure and determine the PMI, CQI, and RI parameters. A field C is used to indicate the first measurement granularity set, and "11" indicates that the first measurement granularity set includes feedback of M sub-bands with optimal channel measurement parameters and feedback of CSI corresponding to N beams with optimal channel measurement parameters, and is used to instruct the UE to determine the M sub-bands with optimal channel measurement parameters and the CSI corresponding to the N beams with optimal channel measurement parameters. In a specific implementation, values of M and N may alternatively be sent by using the first control information, or a value of M and/or a value of N are/is predefined during initialization, or determined through negotiation or by using a configuration of another device. In another embodiment, when a type of a measurement configuration set included in the first control information has been determined, a combination of elements included in two or more measurement configuration sets may also be indicated by using fixed bits in the first control information through joint coding. For example, "10010" is directly corresponding to the first measurement manner set and the first measurement type set included in the first control information, the first measurement manner set includes measurement in a closed-loop MIMO transmission method and measurement in a transmit diversity transmission method, and the first measurement type set includes a PMI and a CQI. An advantage of this is that bit resources can be saved and configuration efficiency can be improved.

In another embodiment, the second control information is downlink control information DCI or a multiple access control element MAC CE. An advantage of using the DCI or the MAC CE is that a configuration is flexible and a response latency is short. There may be one or more second measurement configuration sets herein, which are used to indicate a measurement quantity and a manner in which the UE reports the measurement reference signal.

Similar to the first control information, the second control information may be determined based on a result reported after the UE measures another reference signal. For example, the UE may report feedback information by measuring the another reference signal or receiving a paging message. If the base station determines that the UE is moving or channel quality changes, the base station may determine, based on the measurement configuration set included in the first control information, a measurement configuration set included in the second control information and a specific measurement configuration of each measurement configuration set. For example, when the base station obtains a CQI of the UE in several subframes or slots in another measurement process before determining the second control information, the base station may determine that the measurement configuration set includes at least a measurement manner set, and the measurement manner set includes at least a closed-loop MIMO measurement manner. In another embodiment, the second control information may be further determined based on another configuration. For example, after cell reselection, the second control information may be determined based on historical information, and is supplemented by using a message sent by a neighboring base station or a neighboring control node. Alternatively, the second control information may be determined based on an initial configuration. In another embodiment, the second control information may be used to determine a time period based on the first control information, and the second control information is determined based only on intra-cell or inter-cell movement of the UE in the time period, or another measurement result or a paging message reported by the UE. The another measurement result herein may be a result obtained by the UE through measurement based on a reference signal other than the measurement reference signal. The second control information further indicates a channel resource used by the UE to report the measurement result. The second control information is used to instruct the UE to report a proper measurement result, so that feedback accuracy can be improved, and/or channel resources can be saved. In addition, only the second control information indicates the channel resource used by the UE to report the measurement result, so that a quantity of bits that carry the first control information can be reduced, and unnecessary channel resource overheads can be reduced. In addition, only the second control information indicates the channel resource, so that the base station can flexibly allocate a proper channel resource to the UE based on a channel status or network load at a time of sending the second control information to instruct the UE to report the measurement result, or related information of another UE, to improve flexibility of allocating the channel resource, and help improve an overall data transmission rate of a network. It should be understood that the second control information may be further used to determine, based on another parameter, the channel resource used by the UE to report the measurement result.

In an embodiment, when the first control information includes the first measurement manner set, the second control information may include a second measurement manner set, and the second measurement manner set is a subset of the first measurement manner set. For example, the first control information set includes measurement in an open-loop MIMO transmission method and measurement in a closed-loop MIMO transmission method. After sending the first control information, the base station determines, based on a measurement result reported by another UE or a measurement result reported by the UE based on another measurement reference signal, that the UE is in a high-speed movement state. In this case, the base station determines that the UE does not need to report a result of the measurement in the closed-loop MIMO sending method, and the second measurement manner set does not include the measurement in the closed-loop MIMO transmission method.

In another embodiment, the second control information includes a second measurement type set, and the second measurement type set is a subset of the first measurement type set.

In another embodiment, the second control information includes a second measurement type set, the second measurement type set includes a type of the measurement result, and at least one type of the measurement result that is in the second measurement type set is determined based on the type of the measurement result that is in the first measurement type set. The second measurement type set included in the second control information may include an item that is not in the first measurement type set, and the item that is not in the first measurement type set may be determined through calculation based on an item in the first type set. For example, the first measurement type set includes a channel quality parameter S and a channel noise parameter N, and is used to instruct the UE to measure the measurement reference signal to determine the quality parameter S and the channel noise parameter N. The second measurement type set may include a signal-to-noise ratio SNR parameter, and the SNR may be determined through calculation based on S and N. For another example, the first measurement type set includes a channel spatial covariance matrix, and is used to instruct the UE to measure the measurement reference signal to determine the channel spatial covariance matrix of the UE. The second measurement type set includes an RI and a PMI, and the RI and the PMI may be determined through calculation based on the channel spatial covariance matrix. It should be understood that in the embodiments of the present invention, the first measurement manner set and the second measurement manner set, and the first measurement granularity set and the second measurement granularity set may also have such a relationship.

In another embodiment, the second control information includes the second measurement granularity set, and the second measurement granularity set is different from the first measurement granularity set. For example, the first measurement granularity set includes feedback of M1 sub-bands with highest CQIs, and the second measurement granularity set includes feedback of M2 sub-bands with highest CQIs, where M2 is less than M1. For another example, the second measurement granularity set is a subset of the first measurement granularity set. Similarly, the first measurement granularity set includes CSI corresponding to N1 beams with highest received energy RSRP (reference signal received power), and the second measurement granularity set includes CSI feedback corresponding to N2 beams with highest RSRP, where N2 is less than N1.

It should be understood that in the present invention, the first control information may not only include the foregoing several sets, but also include a first measurement constraint set. The set may include one or more of time domain average measurement, frequency domain average measurement, spatial domain (beam) average measurement, time domain non-average measurement, frequency domain non-average measurement, and spatial domain non-average measurement. The second control information may include a second measurement constraint set that is a subset of the first measurement constraint set. In addition, in the embodiments, elements in the first control information may also be combined and split based on an actual requirement to form a new first measurement configuration set, and the second measurement configuration set is a subset of the first measurement configuration set. For example, a first measurement configuration set may be {measurement in an open-loop MIMO transmission method, measurement in a semi-open-loop MIMO transmission method, PMI, CQI}, and a second measurement configuration set is a subset {measurement in a semi-open-loop MIMO transmission method, PMI} of the first measurement configuration set.

In still another embodiment, the second control information further includes a measurement indication used to instruct the UE to stop measurement or continue measurement. The measurement indication may be used to explicitly or implicitly instruct the UE to stop measuring the measurement reference signal. For example, the second control information includes a start field. When the start field instructs to stop measurement, the second control information is used to instruct the UE to report the measurement result based on the at least one second measurement configuration set and the measurement reference signal. If the second control information does not include a start field or the start field includes an indication for continuous measurement, the second information is used to instruct the UE to measure another measurement reference signal with a same configuration based on the first measurement configuration set. In an embodiment, the measurement indication is determined based on a preset condition or a threshold. For example, the base station determines a downlink data volume, the base station determines that the downlink data volume exceeds a threshold X, and the base station determines that the measurement indication is used to instruct the UE to continue measurement. The method may include the following procedures:

The base station sends first control information to the user equipment UE, where the first control information is used to indicate a measurement reference signal of the UE on a carrier, and the first control information includes at least one first measurement configuration set, and is used to instruct the UE to measure the first measurement reference signal based on the at least one first measurement configuration set.

The base station sends the first measurement reference signal to the UE.

The base station determines that the base station sends second control information to the UE, where the second control information includes at least one second measurement configuration set, is used to instruct the UE to report a first measurement result based on the at least one second measurement configuration set and the measurement reference signal, and is further used to instruct the UE to measure a second measurement reference signal based on the at least one first measurement configuration set, and the at least one second measurement configuration set is different from a first measurement configuration set.

The base station sends the second measurement reference signal to the UE, where the first measurement reference signal and the second measurement reference signal have a same configuration.

The base station determines that the base station sends third control information to the UE, where the third control information includes at least one third measurement configuration set, and is used to instruct the UE to report a second measurement result based on the at least one third measurement configuration set, and the at least one third measurement configuration set is different from a first measurement configuration set, and/or the at least one third measurement configuration set is different from the second measurement configuration set. In the first control information, the second control information, and the third control information, only the second control information and the third control information include uplink resource allocation information, and the uplink resource allocation information is used to indicate a channel resource on which the UE reports the measurement result. In an embodiment, the third control information may also include another measurement indication used to instruct the UE to stop measurement or continue measurement.

In the foregoing solution, the base station may determine accuracy of the first measurement configuration set before sending the second control information. This accuracy may be determined based on a channel condition, a movement status of the UE, or the like. After determining to continue measurement, the base station determines the second measurement configuration set, instructs the UE to report the measurement result, further instructs the UE to continue measurement, and then instructs, by sending the third control information, the UE to report the measurement result based on the third measurement configuration set. This process may be implemented by using the foregoing measurement indication, and the measurement indication signaling is used to control the UE to stop measuring or measure the second measurement reference signal. That the first measurement reference signal and the second measurement reference signal have a same configuration indicates that the first control information and the second control information may also be two reference signals in a same measurement process. In an embodiment, the first measurement reference signal and the second measurement reference signal are reference signals in a same semi-persistent (semi-persistent) pilot sending manner process. The semi-persistent pilot sending manner indicates that after the pilot sending manner is triggered, a transmit end sends a plurality of reference signals to a receive end, and the plurality of reference signals are periodically sent. In this embodiment, the first measurement reference signal and the second measurement reference signal each are at least one of reference signals periodically sent by the base station.

Figure 3:
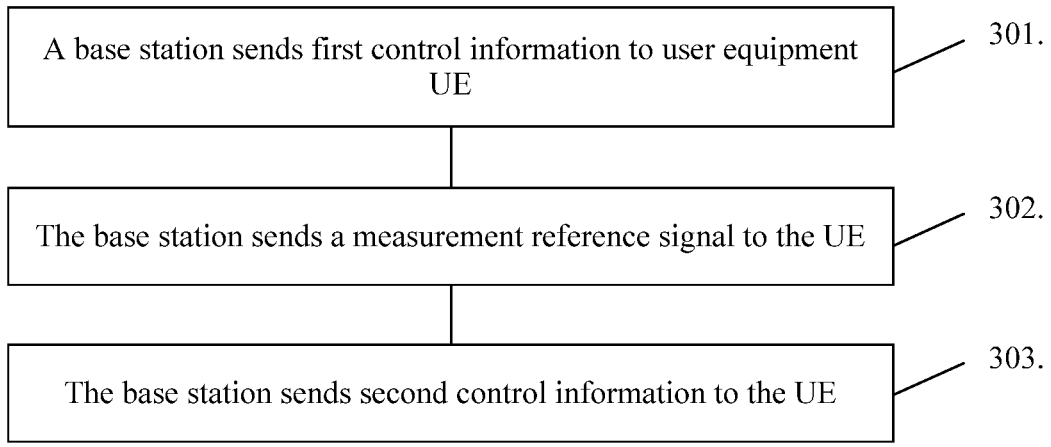
FIG. 3 is a schematic flowchart of a reference signal transmission method according to an embodiment of the present invention.

FIG. 3 is a flowchart of a method for a base station according to an embodiment of the present invention. Referring to FIG. 3, the method includes the following steps:

Step 301: The base station sends first control information to user equipment UE, where the first control information is used to indicate a measurement reference signal of the UE on a carrier, and the first control information includes at least one first measurement configuration set, and is used to instruct the UE to measure the measurement reference signal based on the at least one first measurement configuration set.

Step 302: The base station sends the measurement reference signal to the UE.

Step 303: The base station sends second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set.

Only the second control information in the first control information and the second control information includes uplink resource allocation information, and the uplink resource allocation information is used to indicate a channel resource on which the UE reports the measurement result. The flowchart shown in FIG. 3 may be combined with the embodiments shown in FIG. 2 to implement the method. The second control information is used to instruct the UE to report a proper measurement result, so that feedback accuracy can be improved, and/or channel resources can be saved. In addition, only the second control information indicates the channel resource used by the UE to report the measurement result, so that a quantity of bits that carry the first control information can be reduced, and unnecessary channel resource overheads can be reduced. In addition, only the second control information indicates the channel resource, so that the base station can flexibly allocate a proper channel resource to the UE based on a channel status or network load at a time of sending the second control information to instruct the UE to report the measurement result, or related information of another UE, to improve flexibility of allocating the channel resource, and help improve an overall data transmission rate of a network. It should be understood that the second control information may be further used to determine, based on another parameter, the channel resource used by the UE to report the measurement result.

In an embodiment, the first control information is downlink control information DCI or a multiple access control element MAC CE; and/or the second control information is downlink control information DCI.

In an embodiment, the first control information includes a first measurement manner set, the first measurement manner set includes at least one manner of measuring the measurement reference signal, and the manner of measuring the measurement reference signal is a manner in which the UE measures the measurement reference signal. In another embodiment, the second control information includes a second measurement manner set, and the second measurement manner set is a subset of the first measurement manner set. For example, the first measurement manner set includes one or more of the following measurement manners: measurement in an open-loop MIMO transmission method, measurement in a semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

In an embodiment, the first control information includes a first measurement type set, the first measurement type set includes a type of the measurement result, and the type of the measurement result is a type of a measurement result obtained by the UE by measuring the measurement reference signal. In another embodiment, the second measurement type set is a subset of the first measurement type set. Alternatively, the second control information includes a second measurement type set, the second measurement type set includes a type of the measurement result, and at least one type of the measurement result that is in the second measurement type set is determined based on the type of the measurement result that is in the first measurement type set. For example, the first measurement type set includes one or more of the following measurement manners: a precoding matrix indication PMI, a channel quality indicator CQI, a rank indication RI, a beam indicator CRI, a channel matrix, a channel eigenvector, and a channel spatial covariance matrix.

In an embodiment, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal. In another embodiment, the second control information includes a second measurement granularity set, and the second measurement granularity set is a subset of the first measurement granularity set.

Figure 4:
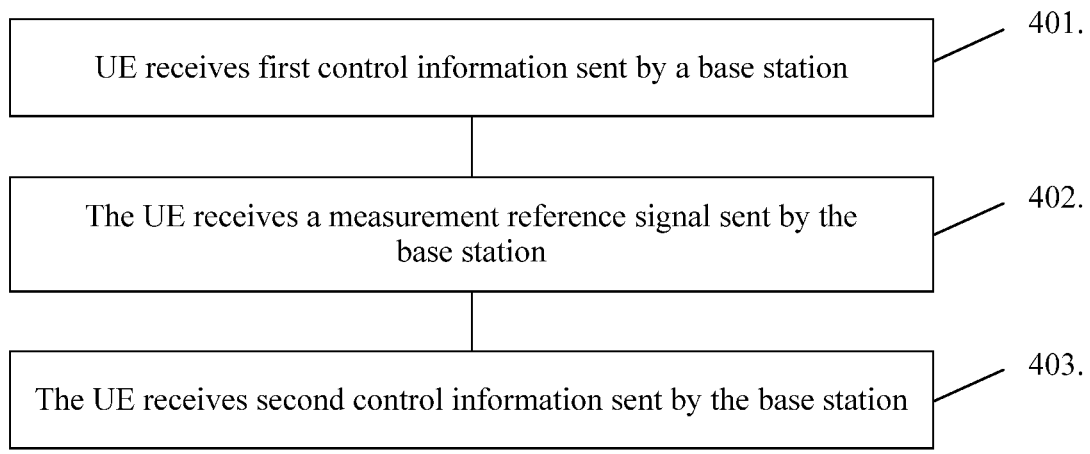
FIG. 4 is a schematic flowchart of a reference signal transmission method according to an embodiment of the present invention.

FIG. 4 is a flowchart of a method for user equipment according to an embodiment of the present invention. Referring to FIG. 4, the method includes the following steps:

Step 401: The user equipment UE receives first control information sent by the base station, where the first control information is used to indicate a measurement reference signal of the UE on a carrier, and the first control information includes at least one first measurement configuration set, and is used to instruct the UE to measure the measurement reference signal based on the at least one first measurement configuration set.

Step 402: The UE receives the measurement reference signal sent by the base station.

Step 403: The user equipment UE receives second control information sent by the base station, where the second control information includes at least one second measurement configuration set, and is used to instruct the UE to report a measurement result based on the at least one second measurement configuration set and the measurement reference signal, and the at least one second measurement configuration set is different from a first measurement configuration set.

Only the second control information in the first control information and the second control information includes uplink resource allocation information, and the uplink resource allocation information is used to indicate a channel resource on which the UE reports the measurement result. Optionally, the method further includes step 404: The UE determines the measurement result based on the second control information. Step 405: The UE reports the measurement result. The flowchart shown in FIG. 4 may be combined with the embodiments shown in FIG. 2 to implement the method. The second control information is used to instruct the UE to report a proper measurement result, so that feedback accuracy can be improved, and/or channel resources can be saved. In addition, only the second control information indicates the channel resource used by the UE to report the measurement result, so that a quantity of bits that carry the first control information can be reduced, and unnecessary channel resource overheads can be reduced. In addition, only the second control information indicates the channel resource, so that the base station can flexibly allocate a proper channel resource to the UE based on a channel status or network load at a time of sending the second control information to instruct the UE to report the measurement result, or related information of another UE, to improve flexibility of allocating the channel resource, and help improve an overall data transmission rate of a network. It should be understood that the second control information may be further used to determine, based on another parameter, the channel resource used by the UE to report the measurement result.

In an embodiment, the first control information is downlink control information DCI or a multiple access control element MAC CE; and/or the second control information is downlink control information DCI.

In an embodiment, the first control information includes a first measurement manner set, the first measurement manner set includes at least one manner of measuring the measurement reference signal, and the manner of measuring the measurement reference signal is a manner in which the UE measures the measurement reference signal. In another embodiment, the second control information includes a second measurement manner set, and the second measurement manner set is a subset of the first measurement manner set. For example, the first measurement manner set includes one or more of the following measurement manners: measurement in an open-loop MIMO transmission method, measurement in a semi-open-loop MIMO transmission method, measurement in a closed-loop MIMO transmission method, measurement in a transmit diversity transmission method, measurement in a single antenna transmission method, measurement in a single-user MIMO transmission method, and measurement in a multi-user MIMO transmission method.

In an embodiment, the first control information includes a first measurement type set, the first measurement type set includes a type of the measurement result, and the type of the measurement result is a type of a measurement result obtained by the UE by measuring the measurement reference signal. In another embodiment, the second measurement type set is a subset of the first measurement type set. Alternatively, the second control information includes a second measurement type set, the second measurement type set includes a type of the measurement result, and at least one type of the measurement result that is in the second measurement type set is determined based on the type of the measurement result that is in the first measurement type set. For example, the first measurement type set includes one or more of the following measurement manners: a precoding matrix indication PMI, a channel quality indicator CQI, a rank indication RI, a beam indicator CRI, a channel matrix, a channel eigenvector, and a channel spatial covariance matrix.

In an embodiment, that the first control information includes at least one first measurement configuration set includes: the first control information includes a first measurement granularity set, the first measurement granularity set includes a granularity of the measurement result, and the granularity of the measurement result is a granularity of a measurement result obtained by the UE by measuring the measurement reference signal. In another embodiment, the second control information includes a second measurement granularity set, and the second measurement granularity set is a subset of the first measurement granularity set.

In an embodiment, a signaling sending method may be defined for the base station, and the method includes the following steps:

The base station sends first control signaling to the UE, where the first control signaling is used to instruct the UE to start sending a semi-persistent measurement reference signal.

The base station sends second control signaling to the UE, where the second control signaling is used to instruct the UE to start reporting a measurement result, and the measurement result is a measurement result determined after the UE measures the semi-persistent reference signal.

The base station sends third control signaling to the UE, where the third control signaling is used to instruct the UE to stop sending the semi-persistent measurement reference signal, and to instruct the UE to stop reporting the measurement result.

Optionally, that the first control signaling is used to instruct the UE to start sending a semi-persistent measurement reference signal includes the following.

After the base station sends the first control signaling to the UE, the base station sends the semi-persistent measurement reference signal at least twice at a first time offset and a first period.

Optionally, that the second control signaling is used to instruct the UE to start reporting a measurement result includes:

After the base station sends the second control signaling to the UE, the base station receives, at a second time offset and a second period, the measurement result reported by the UE at least twice.

Optionally, that the third control signaling is used to instruct the UE to stop sending the semi-persistent measurement reference signal includes the following steps.

After a first effective time from a time at which the base station sends the third control signaling to the UE, the base station stops sending the semi-persistent measurement reference signal.

Optionally, that the third control signaling is used to instruct the UE to stop reporting the measurement result includes:

After a second effective time from a time at which the base station sends the third control signaling to the UE, the base station stops receiving the measurement result reported by the UE.

In an embodiment, a signaling receiving method may be defined for the UE, and the method includes the following steps:

The UE receives first control signaling sent by the base station, where the first control signaling is used to instruct the UE to start sending a semi-persistent measurement reference signal.

The UE receives second control signaling sent by the base station, where the second control signaling is used to instruct the UE to start reporting a measurement result, and the measurement result is a measurement result determined after the UE measures the semi-persistent reference signal.

The UE receives third control signaling sent by the base station, where the third control signaling is used to instruct the UE to stop sending the semi-persistent measurement reference signal, and to instruct the UE to stop reporting the measurement result.

Optionally, that the first control signaling is used to instruct the UE to start sending a semi-persistent measurement reference signal includes:

After the UE receives the first control signaling sent by the base station, the base station sends the semi-persistent measurement reference signal to the UE at least twice at a first time offset and a first period.

Optionally, that the second control signaling is used to instruct the UE to start reporting a measurement result includes:

After the UE receives the second control signaling sent by the base station, the base station receives, at a second time offset and a second period, the measurement result reported by the UE at least twice.

Optionally, that the third control signaling is used to instruct the UE to stop sending the semi-persistent measurement reference signal includes:

After a first effective time from a time at which the UE receives the third control signaling sent by the base station, the base station stops sending the semi-persistent measurement reference signal to the UE.

Optionally, that the third control signaling is used to instruct the UE to stop reporting the measurement result includes:

After a second effective time from a time at which the UE receives the third control signaling sent by the base station, the UE stops reporting the measurement result to the base station.

In an embodiment, a parameter notification method may be defined for the base station, and the method includes the following steps:

The base station notifies the user equipment UE of a first effective time of a semi-persistent measurement reference signal sequence in an adaptive configuration manner.

The base station notifies the UE of a second effective time of the semi-persistent measurement reference signal sequence in the adaptive configuration manner.

Optionally, the semi-persistent measurement reference signal sequence includes at least two measurement reference signals, and the base station sends the at least two measurement reference signals at an equal time interval.

Optionally, the first effective time of the semi-persistent measurement reference signal sequence includes:

The first effective time of the semi-persistent measurement reference signal sequence is a time from a first moment to a time at which the base station sends a first measurement reference signal in the semi-persistent reference measurement signal sequence, and the first moment is known to the base station and the UE.

Optionally, the second effective time of the semi-persistent measurement reference signal sequence is a time from a second moment to a time at which the base station stops sending the measurement reference signal in the semi-persistent reference measurement signal sequence, and the second moment is known to the base station and the UE.

Optionally, that the base station notifies the UE of a first effective time of the semi-persistent measurement reference signal sequence in an adaptive configuration manner includes:

The base station sends third signaling to the UE to notify the UE of a value of the first effective time.

Optionally, that the base station notifies the UE of a first effective time of the semi-persistent measurement reference signal sequence in an adaptive configuration manner further includes:

The base station sends fourth signaling to the UE to notify the UE of a value of at least one element in a first parameter set, where the value of the first effective time is determined based on the value of the at least one element in the first parameter set.

Optionally, the first parameter set includes at least a subcarrier spacing used for the UE by the base station.

Optionally, that the base station notifies the UE of a second effective time of the semi-persistent measurement reference signal sequence in the adaptive configuration manner includes the following steps.

The base station sends fifth signaling to the UE to notify the UE of a value of the second effective time.

Optionally, that the base station notifies the UE of a second effective time of the semi-persistent measurement reference signal sequence in the adaptive configuration manner further includes:

The base station sends sixth signaling to the UE to notify the UE of a value of at least one element in a second parameter set, where the value of the second effective time is determined based on the value of the at least one element in the second parameter set.

Optionally, the second parameter set includes at least a subcarrier spacing used for the UE by the base station.

In an embodiment, a parameter receiving method may be defined for the UE, and the method includes the following steps:

The UE receives a first effective time that is of a semi-persistent measurement reference signal sequence and that is notified by the base station to the UE in an adaptive configuration manner.

The UE receives a second effective time that is of the semi-persistent measurement reference signal sequence and that is notified by the base station to the UE in the adaptive configuration manner.

Optionally, the semi-persistent measurement reference signal sequence includes at least two measurement reference signals, and the base station sends the at least two measurement reference signals at an equal time interval.

Optionally, the first effective time of the semi-persistent measurement reference signal sequence includes:

The first effective time of the semi-persistent measurement reference signal sequence is a time from a first moment to a time at which the base station sends a first measurement reference signal in the semi-persistent reference measurement signal sequence, and the first moment is known to the base station and the UE.

Optionally, the second effective time of the semi-persistent measurement reference signal sequence is a time from a second moment to a time at which the base station stops sending the measurement reference signal in the semi-persistent reference measurement signal sequence, and the second moment is known to the base station and the UE.

Optionally, that the UE receives a first effective time that is of a semi-persistent measurement reference signal sequence and that is notified by the base station to the UE in an adaptive configuration manner includes the following steps.

The UE receives third signaling sent by the base station to notify the UE of a value of the first effective time.

Optionally, that the UE receives a first effective time that is of a semi-persistent measurement reference signal sequence and that is notified by the base station to the UE in an adaptive configuration manner further includes:

The UE receives fourth signaling sent by the base station to notify the UE of a value of at least one element in a first parameter set, where the value of the first effective time is determined based on the value of the at least one element in the first parameter set.

Optionally, the first parameter set includes at least a subcarrier spacing used for the UE by the base station.

Optionally, that the UE receives a second effective time that is of the semi-persistent measurement reference signal sequence and that is notified by the base station to the UE in the adaptive configuration manner includes:

The UE receives fifth signaling sent by the base station to notify the UE of a value of the second effective time.

Optionally, that the UE receives a second effective time that is of the semi-persistent measurement reference signal sequence and that is notified by the base station to the UE in the adaptive configuration manner further includes:

The UE receives sixth signaling sent by the base station to notify the UE of a value of at least one element in a second parameter set, where the value of the second effective time is determined based on the value of the at least one element in the second parameter set.

Optionally, the second parameter set includes at least a subcarrier spacing used for the UE by the base station.

In an embodiment, a first information receiving method may be further defined for the base station, and the method includes the following steps the following steps.

The base station sends first signaling to the UE, where the first signaling is used to instruct the UE to report a group of semi-persistent information sequences, and the group of semi-persistent information sequences includes at least one semi-persistent information sequence.

The base station sends second signaling to the UE, where the second signaling is used to instruct the UE to stop reporting the at least one semi-persistent information sequence in the group of semi-persistent information sequences.

After the base station sends the second signaling to the UE, the base station receives, only in a first time window, at least one piece of information that has not been reported in the at least one semi-persistent information sequence in the group of semi-persistent information sequences reported by the UE.

Optionally, the semi-persistent information sequence includes at least two pieces of semi-persistent information, and the base station receives, at an equal time interval, the at least two pieces of semi-persistent information reported by the UE to the base station.

Optionally, a value of the first time window is known to the base station and the UE.

In an embodiment, a first information sending method may be further defined for the UE, and the method includes the following steps the following steps.

The UE receives first signaling sent by the base station, where the first signaling is used to instruct the UE to report a group of semi-persistent information sequences, and the group of semi-persistent information sequences includes at least one semi-persistent information sequence.

The user equipment UE receives second signaling sent by the base station, where the second signaling is used to instruct the UE to stop reporting the at least one semi-persistent information sequence in the group of semi-persistent information sequences.

After the user equipment UE receives the second signaling sent by the base station, the UE reports, to the base station only in a first time window, at least one piece of information that has not been reported in the at least one semi-persistent information sequence in the group of semi-persistent information sequences.

Optionally, the semi-persistent information sequence includes at least two pieces of semi-persistent information, and the UE reports the at least two pieces of semi-persistent information to the base station at an equal time interval.

Optionally, a value of the first time window is known to the base station and the UE.

In an embodiment, a second information receiving method may be further defined for the base station, and the method includes the following steps the following steps.

The base station sends first signaling to the UE, where the first signaling is used to instruct the UE to report a group of semi-persistent information sequences, and the group of semi-persistent information sequences includes at least one semi-persistent information sequence.

The base station sends second signaling to the UE, where the second signaling is used to instruct the UE to stop reporting the at least one semi-persistent information sequence in the group of semi-persistent information sequences.

After the base station sends the second signaling to the UE, the base station receives only first information reported by the UE at a time closest to a moment at which the base station sends the second signaling to the UE, where the first information is information that has not been reported by the UE in the at least one semi-persistent information sequence in the group of semi-persistent information sequences.

Optionally, the semi-persistent information sequence includes at least two pieces of semi-persistent information, and the base station receives, at an equal time interval, the at least two pieces of semi-persistent information reported by the UE to the base station.

In an embodiment, a second information sending method may be further defined for the UE, and the method includes the following steps the following steps.

The UE receives first signaling sent by the base station to the UE, where the first signaling is used to instruct the UE to report a group of semi-persistent information sequences, and the group of semi-persistent information sequences includes at least one semi-persistent information sequence.

The UE receives second signaling sent by the base station to the UE, where the second signaling is used to instruct the UE to stop reporting the at least one semi-persistent information sequence in the group of semi-persistent information sequences.

After the UE receives the second signaling sent by the base station to the UE, the UE reports only first information reported by the UE at a time closest to a moment at which the base station sends the second signaling to the UE, where the first information is information that has not been reported by the UE in the at least one semi-persistent information sequence in the group of semi-persistent information sequences.

Optionally, the semi-persistent information sequence includes at least two pieces of semi-persistent information, and the UE reports the at least two pieces of semi-persistent information to the base station at an equal time interval.

In an embodiment, a third information sending method may be further defined for the base station, and the method includes the following steps the following steps.

The base station sends first signaling to the UE, where the first signaling is used to instruct the UE to report a group of semi-persistent information sequences, and the group of semi-persistent information sequences includes at least one semi-persistent information sequence.

The base station sends second signaling to the UE, where the second signaling is used to instruct the UE to stop reporting the at least one semi-persistent information sequence in the group of semi-persistent information sequences.

After the base station sends the second signaling to the UE, the base station receives only first information reported by the UE, where the first information is information with a highest priority that is in the at least one semi-persistent information sequence in the group of semi-persistent information sequences and that is in information that has not been reported by the UE.

Optionally, the semi-persistent information sequence includes at least two pieces of semi-persistent information, and the base station receives, at an equal time interval, the at least two pieces of semi-persistent information reported by the UE to the base station.

Optionally, the priority is known to the base station and the UE.

In an embodiment, a third information sending method may be further defined for the UE, and the method includes the following steps the following steps.

The UE receives first signaling sent by the base station to the UE, where the first signaling is used to instruct the UE to report a group of semi-persistent information sequences, and the group of semi-persistent information sequences includes at least one semi-persistent information sequence.

The UE receives second signaling sent by the base station to the UE, where the second signaling is used to instruct the UE to stop reporting the at least one semi-persistent information sequence in the group of semi-persistent information sequences.

After the UE receives the second signaling sent by the base station to the UE, the UE reports only first information to the base station, where the first information is information with a highest priority that is in the at least one semi-persistent information sequence in the group of semi-persistent information sequences and that is in information that has not been reported by the UE.

Optionally, the semi-persistent information sequence includes at least two pieces of semi-persistent information, the base station receives, at an equal time interval, the at least two pieces of semi-persistent information reported by the UE to the base station, and the UE reports the at least two pieces of semi-persistent information to the base station at an equal time interval.

Optionally, the priority is known to the base station and the UE.

Figure 5:
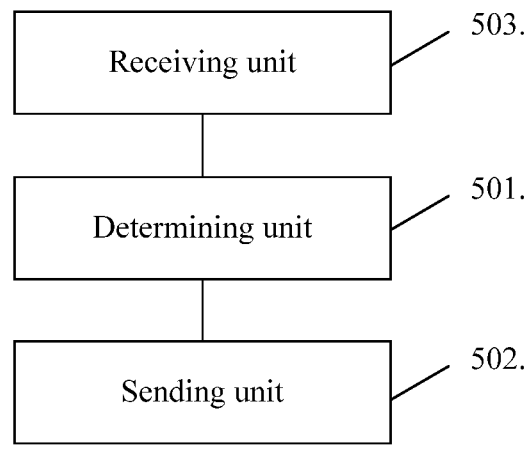
FIG. 5 is a schematic apparatus diagram of a base station device according to an embodiment of the present invention.

FIG. 5 is a structural diagram of a base station apparatus according to an embodiment of the present invention. Referring to FIG. 5, the base station apparatus 500 includes a determining unit 501 and a sending unit 502, to implement functions in the embodiments in FIG. 1 and FIG. 3. For example, the determining unit 501 is configured to determine a measurement reference signal, first control information, and second control information. The sending unit 502 is configured to send the first control information to user equipment UE, where the first control information is used to indicate the measurement reference signal of the UE on a carrier, and the first control information includes at least one first measurement configuration set, and is used to instruct the UE to measure the measurement reference signal based on the at least one first measurement configuration set. The sending unit 502 is further configured to send the measurement reference signal to the UE. The sending unit 502 is further configured to send the second control information to the UE, where the second control information includes at least one second measurement configuration set, and is used to instruct the UE to report a measurement result based on the at least one second measurement configuration set and the measurement reference signal, and the at least one second measurement configuration set is different from a first measurement configuration set. The base station apparatus may further include a receiving unit 503, configured to receive the measurement result sent by the UE.

Figure 6:
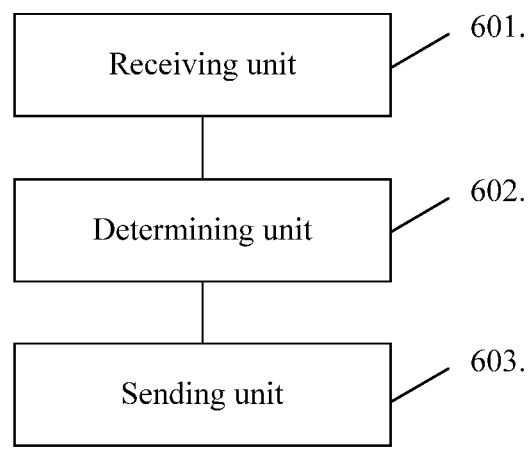
FIG. 6 is a schematic apparatus diagram of user equipment according to an embodiment of the present invention.

FIG. 6 is a structural diagram of user equipment according to an embodiment of the present invention. Referring to FIG. 6, the user equipment 600 includes a receiving unit 601 and a determining unit 602, to implement functions in the embodiments in FIG. 1 and FIG. 4. For example, the receiving unit 601 is configured to receive first control information sent by a base station, where the first control information is used to indicate a measurement reference signal of the UE on a carrier, and the first control information includes at least one first measurement configuration set. The determining unit 602 is configured to measure the measurement reference signal based on the at least one first measurement configuration set. The receiving unit 601 is further configured to receive the measurement reference signal sent by the base station. The receiving unit 601 is further configured to receive second control information sent by the base station, where the second control information includes at least one second measurement configuration set, and is used to instruct the UE to report a measurement result based on the at least one second measurement configuration set and the measurement reference signal, and the at least one second measurement configuration set is different from a first measurement configuration set, where only the second control information in the first control information and the second control information includes uplink resource allocation information, and the uplink resource allocation information is used to indicate a channel resource on which the UE reports the measurement result. The user equipment may further include a sending unit 603, configured to send the measurement result.

It should be understood that the units may be combined with each other or replaced or split within a proper range. The unit division in the embodiments of the present invention is an example and is merely a logical function division. There may be another division manner during actual implementation. Function units in the embodiments of the present invention may be integrated into one processing unit, or each of the units may exist alone physically, or two or more units are integrated into one unit. For example, the receiving unit and the sending unit may be a transceiver unit.

Figure 7:
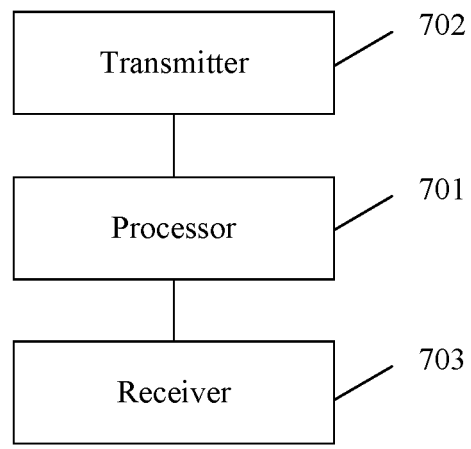
FIG. 7 is a schematic apparatus diagram of a base station device according to an embodiment of the present invention.

FIG. 7 is a structural diagram of a base station apparatus according to an embodiment of the present invention. Referring to FIG. 7, the base station apparatus 700 includes a processor 701 and a transmitter 702, to implement functions in the embodiments in FIG. 1, FIG. 3, and FIG. 5. The base station apparatus may further include a receiver 703, configured to: receive the measurement result, and implement a function of the receiving unit 503 in FIG. 5. The receiver 703 and the transmitter 702 may be further a simplex, duplex, or half-duplex transceiver. The processor 701 may further include a memory (not shown), configured to: store data and start a program of the processor 701. The processor 701 may further cooperate with the memory to implement a configured function. The memory may further include a computer program, to implement the functions in the embodiments in FIG. 1, FIG. 3, and FIG. 5 by using software.

Figure 8:
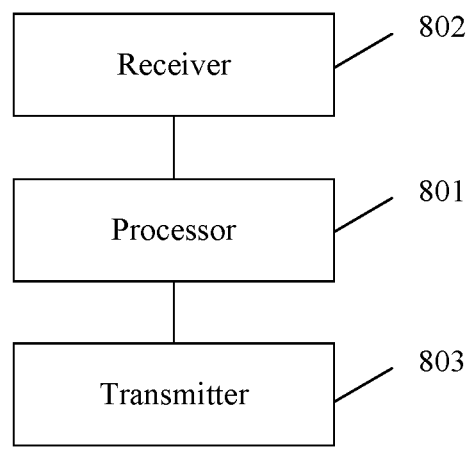
FIG. 8 is a schematic apparatus diagram of user equipment according to an embodiment of the present invention.

FIG. 8 is a structural diagram of user equipment according to an embodiment of the present invention. Referring to FIG. 8, the user equipment 800 includes a processor 801 and a receiver 802, to implement functions in the embodiments in FIG. 2, FIG. 4, and FIG. 6. The base station apparatus may further include a transmitter 803, configured to: send the measurement result, and implement a function of the sending unit 603 in FIG. 6. The receiver 802 and the transmitter 803 may be further a simplex, duplex, or half-duplex transceiver. The processor 801 may further include a memory (not shown), configured to: store data and start a program of the processor 801. The processor 801 may further cooperate with the memory to implement a configured function. The memory may further include a computer program, to implement the functions in the embodiments in FIG. 2, FIG. 4, and FIG. 6 by using software.

In the embodiments shown in FIG. 7 and FIG. 8, the processor may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
sending, by a base station, first control information to user equipment (UE), the first control information indicating a measurement reference signal of the UE on a carrier, comprising a first measurement configuration set, and instructing the UE to measure the measurement reference signal based on the first measurement configuration set;
sending, by the base station, the measurement reference signal to the UE; and
sending, by the base station, second control information to the UE, the second control information comprising a second measurement configuration set and instructing the UE to report a measurement result based on the second measurement configuration set and the measurement reference signal, wherein:
the second measurement configuration set is different from the first measurement configuration set, and
of the first control information and the second control information, only the second control information comprises uplink resource allocation information indicating a channel resource on which the UE reports the measurement result.

2. The method according to claim 1, wherein the first measurement configuration set comprises a first measurement manner set, the first measurement manner set comprising a manner in which the UE measures the measurement reference signal.

3. The method according to claim 2, wherein the second control information comprises a second measurement manner set, the second measurement manner set being a subset of the first measurement manner set.

4. The method according to claim 1, wherein the first measurement configuration set comprises a first measurement type set, the first measurement type set comprising a type of the measurement result obtained by the UE measuring the measurement reference signal.

5. The method according to claim 4, wherein the second control information comprises a second measurement type set, the second measurement type set being a subset of the first measurement type set.

6. A method, comprising:
receiving, by user equipment (UE), first control information sent by a base station, the first control information indicating a measurement reference signal of the UE on a carrier, comprising a first measurement configuration set, and instructing the UE to measure the measurement reference signal based on the first measurement configuration set;
receiving, by the UE, the measurement reference signal sent by the base station; and
receiving, by the UE, second control information sent by the base station, the second control information comprising a second measurement configuration set and instructing the UE to report a measurement result based on the second measurement configuration set and the measurement reference signal, wherein:
the second measurement configuration set is different from the first measurement configuration set, and
of the first control information and the second control information, only the second control information comprises uplink resource allocation information indicating a channel resource on which the UE reports the measurement result.

7. The method according to claim 6, wherein the first measurement configuration set comprises a first measurement manner set, the first measurement manner set comprising a manner of measuring in which the UE measures the measurement reference signal.

8. The method according to claim 7, wherein the second control information comprises a second measurement manner set, the second measurement manner set being a subset of the first measurement manner set.

9. The method according to claim 6, wherein the first measurement configuration set comprises a first measurement type set, the first measurement type set comprising a type of the measurement result obtained by the UE measuring the measurement reference signal.

10. The method according to claim 9, wherein the second control information comprises a second measurement type set, the second measurement type set being a subset of the first measurement type set.

11. A base station, comprising:
a non-transitory memory storage comprising instructions;
a processor in communication with the non-transitory memory storage, the processor executing the instructions to determine a measurement reference signal, first control information, and second control information; and
a transmitter configured to:
send the first control information to user equipment (UE), the first control information indicating the measurement reference signal of the UE on a carrier, comprising a first measurement configuration set, and instructing the UE to measure the measurement reference signal based on the first measurement configuration set;
send the measurement reference signal to the UE; and
send the second control information to the UE, the second control information comprising a second measurement configuration set and instructing the UE to report a measurement result based on the second measurement configuration set and the measurement reference signal, wherein:
the second measurement configuration set is different from the first measurement configuration set, and
of the first control information and the second control information, only the second control information comprises uplink resource allocation information indicating a channel resource on which the UE reports the measurement result.

12. The base station according to claim 11, wherein the first measurement configuration set comprises a first measurement manner set, the first measurement manner set comprising a manner in which the UE measures the measurement reference signal.

13. The base station according to claim 12, wherein the second control information comprises a second measurement manner set, the second measurement manner set being a subset of the first measurement manner set.

14. The base station according to claim 11, wherein the first measurement configuration set comprises a first measurement type set, the first measurement type set comprising a type of the measurement result obtained by the UE measuring the measurement reference signal.

15. The base station according to claim 14, wherein the second control information comprises a second measurement type set, the second measurement type set being a subset of the first measurement type set.

16. User equipment (UE), comprising:
a receiver configured to:
receive first control information sent by a base station, the first control information indicating a measurement reference signal of the UE on a carrier and comprising a first measurement configuration set; and
receive the measurement reference signal sent by the base station;
a non-transitory memory storage comprising instructions; and
a processor in communication with the non-transitory memory storage, the processor executing the instructions to measure the measurement reference signal based on the first measurement configuration set, wherein:
the receiver is further configured to receive second control information sent by the base station, the second control information comprising a second measurement configuration set and instructing the UE to report a measurement result based on the second measurement configuration set and the measurement reference signal,
the second measurement configuration set is different from a first measurement configuration set, and
of the first control information and the second control information, only the second control information comprises uplink resource allocation information indicating a channel resource on which the UE reports the measurement result.

17. The UE according to claim 16, wherein the first measurement configuration set comprises a first measurement manner set, the first measurement manner set comprising a manner in which the UE measures the measurement reference signal.

18. The UE according to claim 17, wherein the second control information comprises a second measurement manner set, the second measurement manner set being a subset of the first measurement manner set.

19. The UE according to claim 16, wherein the first measurement configuration set comprises a first measurement type set, the first measurement type set comprising a type of the measurement result obtained by the UE measuring the measurement reference signal.

20. The UE according to claim 19, wherein the second control information comprises a second measurement type set, the second measurement type set being a subset of the first measurement type set.

* * * * *